(12) United States Patent
Takatani

(10) Patent No.: US 6,490,012 B1
(45) Date of Patent: Dec. 3, 2002

(54) LIQUID CRYSTAL DISPLAY DEVICE

(75) Inventor: Tomoo Takatani, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 139 days.

(21) Appl. No.: 09/586,385

(22) Filed: Jun. 2, 2000

(30) Foreign Application Priority Data

Jun. 2, 1999 (JP) ............................................. 11-154483
Apr. 28, 2000 (JP) ......................................... 2000-129558

(51) Int. Cl.⁷ ....................... G02F 1/1333; G02F 1/1335
(52) U.S. Cl. .......................................... 349/12; 349/195
(58) Field of Search .......................... 349/12, 137, 195, 349/104

(56) References Cited

U.S. PATENT DOCUMENTS 4,680,430 A * 7/1987 Yoshikawa et al. ............ 178/19
5,886,819 A * 3/1999 Murata et al. ............... 359/483
6,281,952 B1 * 8/2001 Okamoto et al. ............. 349/12
6,312,788 B1 * 11/2001 Mohri et al. ................ 349/12

FOREIGN PATENT DOCUMENTS

| JP | 9-127312 | 5/1997 |
| JP | 9-193332 | 7/1997 |
| JP | 9-193333 | 7/1997 |

* cited by examiner

Primary Examiner—Toan Ton
Assistant Examiner—Hoan Nguyen
(74) Attorney, Agent, or Firm—David G. Conlin; Steven M. Jensen; Edwards & Angell, LLP

(57) ABSTRACT

A liquid crystal display device having a touch panel that exploits a shutter effect of a liquid crystal layer includes an antiglare film placed behind the touch panel as seen by the viewer. The antiglare film fulfills the following three conditions: $0.3 < Ra \leq 0.4$; $50 < Sm \leq 80$; and $5 \leq H \leq 20$; where $Ra$ represents the center-line mean roughness ($\mu$m) of the surface of the antiglare film, $Sm$ represents the irregularity interval ($\mu$m) of the surface, and $H$ represents the haze value (%).

4 Claims, 4 Drawing Sheets

LIQUID CRYSTAL DISPLAY DEVICE

BACKGROUND OF THE INVENTION

1. Field of the Invention

The present invention relates to a liquid crystal display device having a touch panel.

2. Description of the Prior Art

Two main types of known image display devices for displaying information are CRTs (cathode-ray tubes) and liquid crystal display devices. CRTs have the disadvantages of being large and heavy and consuming much electric power. By contrast, liquid crystal display devices have the advantages of occupying minimal space, being light-weight, and consuming minimal electric power. For these reasons, liquid crystal display devices are nowadays widely used in various applications. Liquid crystal display devices are effective as display devices for use in personal computers and household appliances, and are particularly so in cellular telephones and portable digital assistants where portability is an important factor.

Liquid crystal display devices sometimes suffer from unwanted reflection, in which, for example, the face of the person viewing the liquid crystal screen or external light such as the light from the sun or a fluorescent lamp is reflected from the liquid crystal panel. This is particularly troublesome when a portable digital assistant is used outdoors, because such unwanted reflection degrades the quality of the displayed image. Moreover, under such conditions, glare (moiré image interference fringes) is also likely.

To suppress glare and obtain satisfactory image quality, an antiglare film is sometimes bonded on the viewer side of the polarizer plate of a liquid crystal display device. This antiglare film serves to suppress reflection of external light as mentioned above by being formed out of a transparent resin film or the like having its surface roughened. For example, such an antiglare film is produced by forming a transparent base out of a resin such as polyethylene terephthalate and then roughening its surface by etching or the like. The characteristics of an antiglare film are represented by the center-line mean roughness Ra ($\mu$m) defined in JIS (Japanese Industrial Standards) B0601, the irregularity interval Sm ($\mu$m), and the haze value H (%) defined in JIS K7105.

Antiglare films are disclosed, for example, in Japanese Patent Applications Laid-Open Nos. H9-127312, H9-193332, and H9-193333. The antiglare film disclosed in Japanese Patent Application Laid-Open No. H9-127312 is formed such that Ra is in the range from 0.03 to 0.3 $\mu$m, Sm is 50 $\mu$m or less, and H is in the range from 1 to 25%.

The antiglare film disclosed in Japanese Patent Application Laid-Open No. H9-193332 is formed such that Ra is in the range from 0.1 to 0.3 $\mu$m, Sm is in the range from 30 to 100 $\mu$m, and H is in the range from 14 to 22%. The antiglare film disclosed in Japanese Patent Application Laid-Open No. H9-193333 is formed such that Ra is in the range from 0.05 to 0.2 $\mu$m, Sm is in the range from 60 to 180 $\mu$m, and H is in the range from 3 to 8%.

All of these antiglare films are to be placed at the forward end of a liquid crystal display device so as to effectively reduce unwanted reflection of external light and glare.

In the field of portable digital assistants, the market has recently been growing for portable digital assistants that are provided with a liquid crystal display device having a touch panel that allows pen-based data entry. Conventionally, the mainstream of such touch panels is the type that is bonded at the forward end of a liquid crystal display device. Among different types of touch panels, such as optical, supersonic, electromagnetic-induction-based, and resistive-film-based touch panels, resistive-film-based touch panels are typically used in portable digital assistants.

When an antiglare film is incorporated in a portable digital assistant provided with a liquid crystal display device having a touch panel, its display portion is usually assembled by arranging, from the viewer side, the touch panel, the antiglare film, a first polarizer plate, a first phase-difference plate, a liquid crystal display element, a second phase-difference plate, and a second polarizer plate. As is well known, here, the polarizer plates are used to extract light polarized in a particular direction, and the phase-difference plates are used to compensate colors optically. As the liquid crystal display element is used, for example, an STN (super-twisted nematic) type liquid crystal display element.

As shown in FIG. 3, a resistive-film-based touch panel 3 is formed by arranging, from the viewer side, a film 11, an electrode 12a, a spacer 13, an electrode 12b, and a glass plate 14. This touch panel 3 as a whole is bonded, with double-faced adhesive tape 15, to an antiglare film 2 that is placed on top of a liquid crystal display element 1.

However, a resistive-film-based touch panel 3 as shown in FIG. 3 functions as a data entry switch, with the electrodes 12a and 12b, each formed out of a transparent conductive film, serving as conductors. Accordingly, if this touch panel 3 is used together with an antiglare film 2 of which the characteristics Ra, Sm, and H are defined as disclosed in Japanese Patent Applications Laid-Open Nos. H9-127312, H9-193332, and H9-193333 mentioned above, the light reflected from the forward-end surface of the touch panel 3 and from the individual layers constituting it (i.e. the electrodes 12a and 12b, the glass plate 15, etc.) interferes with the light reflected from the surface of the antiglare film 2 placed on top of the liquid crystal display element 1.

This rather aggravates glare in the displayed image, and thereby greatly degrades viewability. On the other hand, if the antiglare film 2 is removed, glare is suppressed, but unwanted reflection degrades the quality of the displayed image.

SUMMARY OF THE INVENTION

An object of the present invention is to provide a liquid crystal display device having a touch panel that offers satisfactory image quality with a minimum of unwanted reflection and glare.

To achieve the above object, according to one aspect of the present invention, in a liquid crystal display device having a touch panel that exploits a shutter effect of a liquid crystal layer, an antiglare film is placed behind the touch panel as seen from the viewer and the antiglare film fulfills conditions (1), (2), and (3) below:

$$0.3 \leq Ra \leq 0.4 \quad (1)$$

$$50 \leq Sm \leq 80 \quad (2)$$

$$5 \leq H \leq 20 \quad (3)$$

where Ra represents the center-line mean roughness ($\mu$m) of the surface of the antiglare film, Sm represents the irregularity interval ($\mu$m) of the surface, and H represents the haze value (%).

According to another aspect of the present invention, in a liquid crystal display device having a touch panel that exploits a shutter effect of a liquid crystal layer, the touch panel, an antiglare film, a first polarizer plate, a first phase-difference plate, an STN-type liquid crystal display element, a second phase-difference plate, and a second polarizer plate are arranged in this order from the viewer side, and the antiglare film fulfills conditions (1), (2), and (3) above.

In this liquid crystal display device, the touch panel may be of a type that employs a resistive film, and in addition a gap may be secured between the touch panel and the antiglare film.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
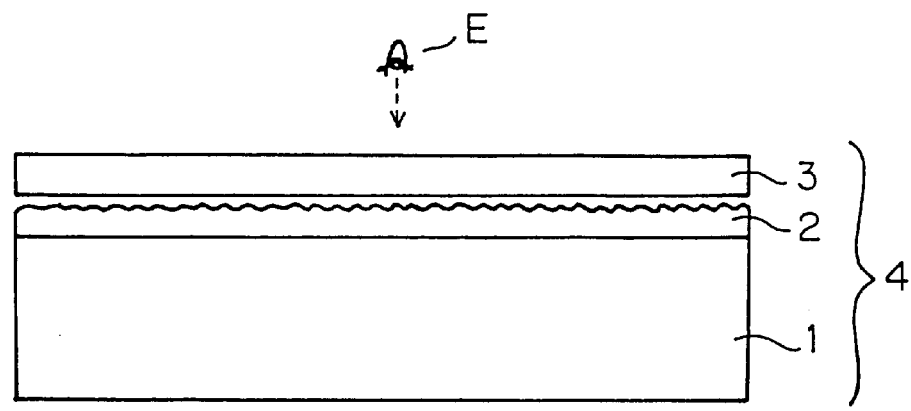
FIG. 1 is a diagram showing the overall structure of a liquid crystal display device having a touch panel embodying the invention.

An embodiment of the present invention will be described below with reference to the accompanying drawings. FIG. 1 is a diagram showing the structure of a liquid crystal display device having a touch panel embodying the invention. This liquid crystal display device 4 is formed by bonding an antiglare film 2 on top of a liquid crystal display element 1, and then laying a touch panel 3 further on top. In actual use, the liquid crystal display device 4 is placed with the touch panel 3 facing the viewer. The reference symbol E indicates the eye of the viewer.

Figure 2:
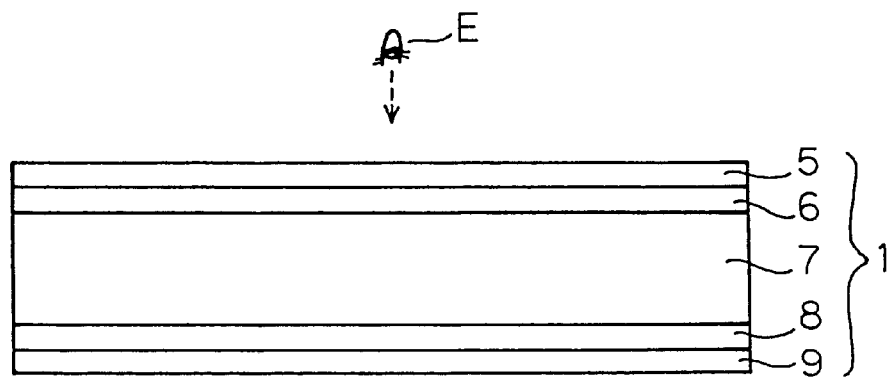
FIG. 2 is a detailed sectional view of the liquid crystal display element used in the liquid crystal display device having a touch panel embodying the invention.

FIG. 2 is a detailed sectional view of the liquid crystal display element 1 shown in FIG. 1. The liquid crystal display element 1 is formed by laying, from the viewer side, a first polarizer plate 5, a first phase-difference plate 6, an STN-type liquid crystal display element 7, a second phase-difference plate 8, and a second polarizer plate 9.

As the transparent base of the antiglare film 2, it is preferable to use a resin film made of a well-known material such as polyethylene terephthalate, triacetylcellulose, polycarbonate, or polysulfone.

To optimize the characteristics of the antiglare film 2, specifically, to determine the optimum ranges of the center-line mean roughness Ra, irregularity interval Sm, and haze value H thereof, viewability tests were conducted under various conditions. Here, the center-line mean roughness Ra is a quantity defined in JIS B 0601-1982, and is determined as follows. From a roughness curve, a portion thereof is extracted for a given measuring length (cut-off length) L in the direction of the center line thereof. Then, for the extracted portion, assuming that its center line is the X axis and that the vertical magnification direction is the Y axis, a function y=f(x) that represents the roughness curve is determined. Now, the center-line mean roughness Ra, given in $\mu$m, is determined using the following formula:

$$\frac{1}{L}\int_0^L |f(x)|dx$$

The irregularity interval Sm is determined as follows. From a roughness curve, a portion thereof is extracted for a given measuring length (cut-off length) L in the direction of the center line thereof. Then, the intervals between peaks Si (i=1, 2, 3, . . . ) are determined. Now, the irregularity interval Sm is determined using the following formula:

$$\frac{1}{n}\sum_{i=1}^{n} Si$$

The haze value H is a quantity defined in JIS K 7105, and is determined as follows. A glass plate and a polarizer plate are bonded together, and are then illuminated with light that is shone from the glass plate side. Then, the diffuse transmittance Td and the total transmittance Tt are determined. Now, the haze value H is determined using the following formula:

$$H = Td/Tt \times 100\ (\%)$$

In the tests conducted, the center-line mean roughness Ra and the u irregularity interval Sm were measured using a surface roughness tester, the model Surfcom-570A, manufactured by Tokyo Seimitsu Co., Ltd., with the cut-off length set at 0.4 mm; on the other hand, the haze value H was measured using a direct-reading haze computer, the model HDM-2DP, manufactured by Suga Test Instruments Co., Ltd.

Figure 3:
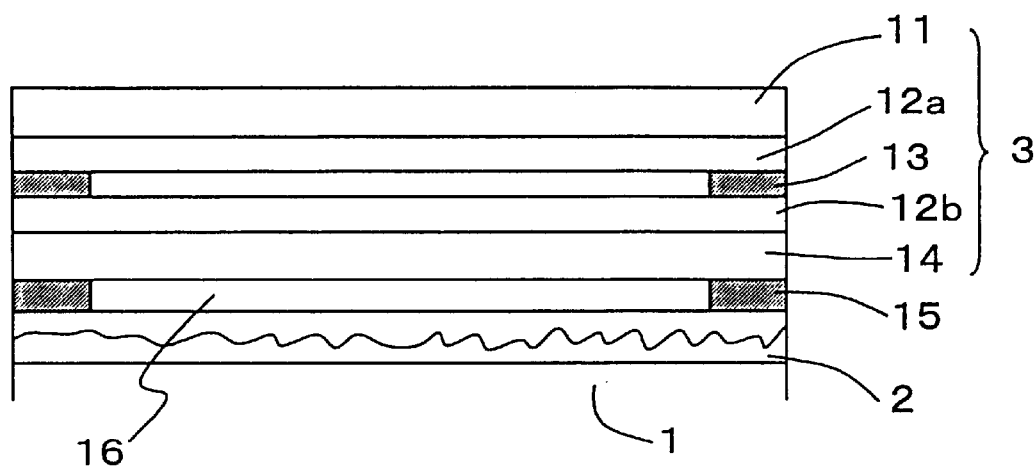
FIG. 3 is a detailed sectional view of the touch panel used in the liquid crystal display device having a touch panel embodying the invention.

As the touch panel 3, a widely used resistive-film-based touch panel was used. As shown in FIG. 3 described previously, a resistive-film-based touch panel 3 is formed by arranging, from the viewer side, a protective film 11, an electrode (resistive film) 12a, a spacer 13, an electrode (resistive film) 12b, and a glass plate 14, The electrodes 12a and 12b are each formed out of a transparent conductive film, and are arranged so as to face each other with the spacer 13 about 30 $\mu$m thick placed between them. A pressure from above as seen in this figure causes the electrodes 12a and 12b to make contact with each other, and this permits entry of a signal.

This touch panel 3 as a whole is bonded, with double-faced adhesive tape 15, to the antiglare film 2 that is placed on top of the liquid crystal display element 1. Here, a gap 16 about 40 $\mu$m thick is secured between the antiglare film 2 and the touch panel 3. This helps suppress interference between the light reflected from the antiglare film 2 and the light reflected from the touch panel 3. Instead of the double-faced adhesive tape 15, adhesive or the like may be used.

In the tests, glare, antiglare performance, and image reproducibility were evaluated with different values of the center-line mean roughness Ra, irregularity interval Sm, and haze value H explained above. Glare was evaluated by visually checking the opening screen of WindowsCE™ displayed on the screen of the liquid crystal display device connected to a personal computer.

Antiglare performance was evaluated by visually checking how the face of the viewer, located 50 cm away from the screen of the liquid crystal display device perpendicularly thereto, is reflected from the screen when the entire screen is turned black under a 40W fluorescent lamp. The image reproducibility was evaluated by visually checking the presence/absence of blurring in characters displayed on the screen of the liquid crystal display device with and without the antiglare film bonded thereto. In all of these evaluations, the results are given on a "good or poor" basis, with "good" and "poor" indicated by "○" and "x", respectively.

Figure 4:
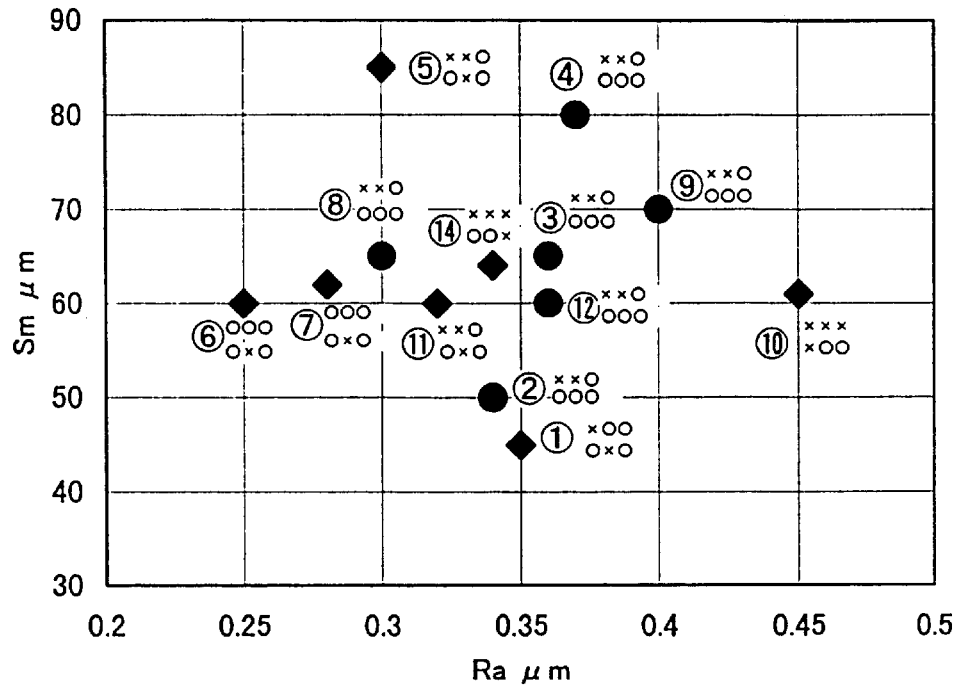
FIG. 4 is a graph used to optimize the center-line mean roughness Ra and the irregularity interval Sm of the antiglare film of the liquid crystal display device having a touch panel embodying the invention.
Figure 5:
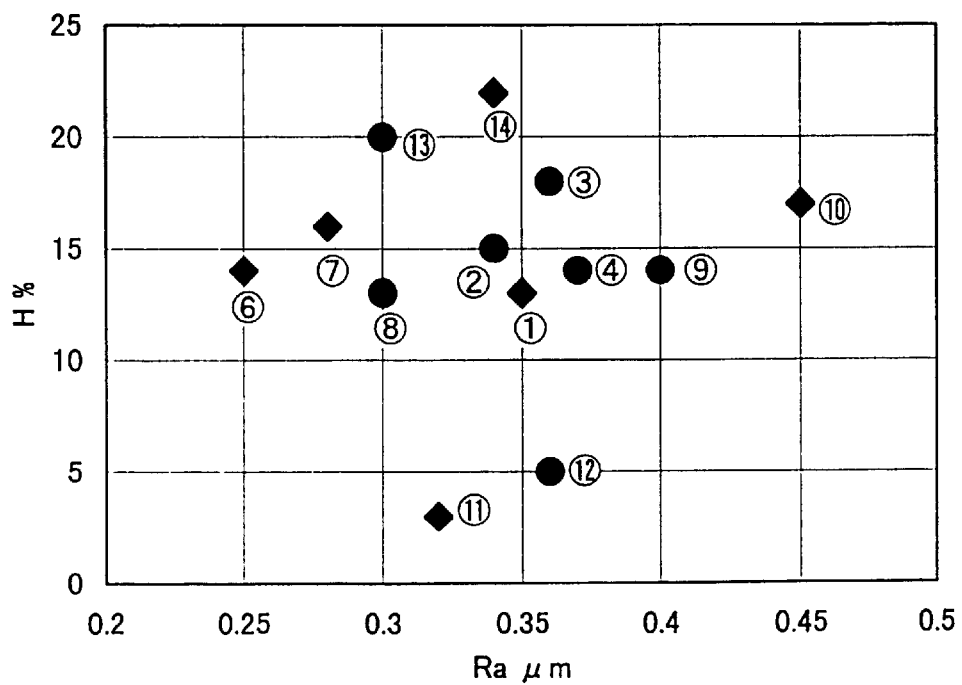
FIG. 5 is a graph used to optimize the center-line mean roughness Ra and the haze value H of the antiglare film of the liquid crystal display device having a touch panel embodying the invention.
Figure 6:
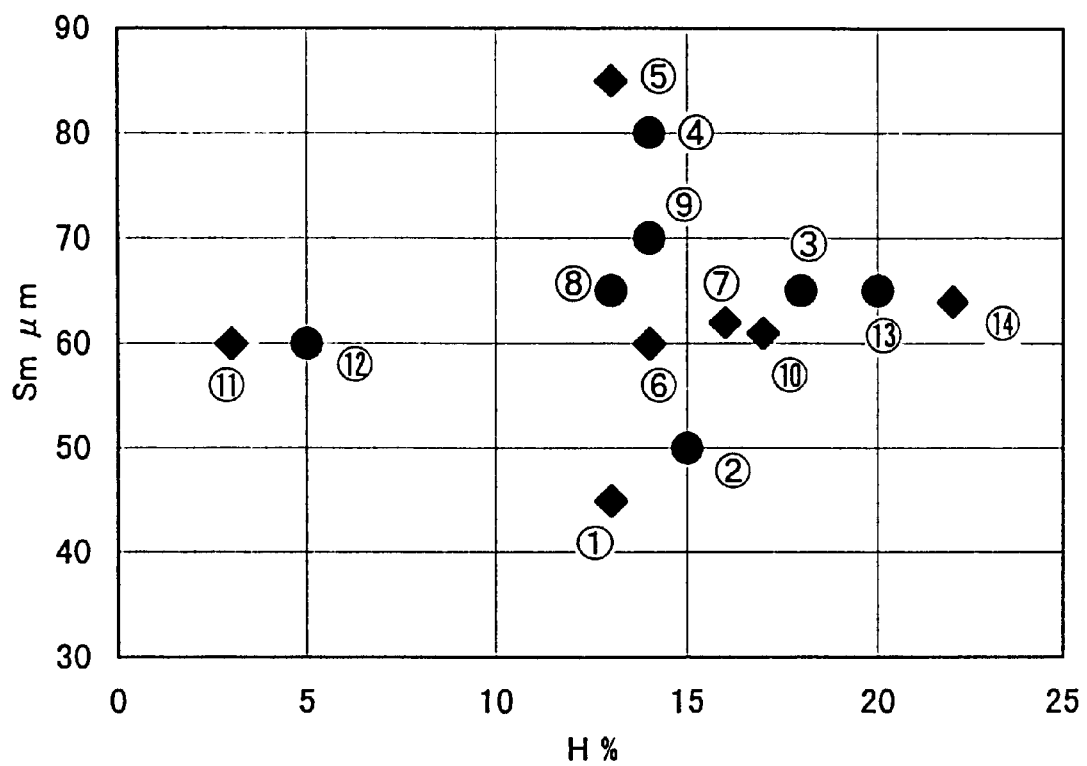
FIG. 6 is a graph used to optimize the haze value H and the irregularity interval Sm of the antiglare film of the liquid crystal display device having a touch panel embodying the invention.

The results of the above-described evaluations are shown in Tables 1 to 4 and in FIGS. 4 to 6. Tests Nos. ① to ⑭ are the tests conducted with the liquid crystal display device embodying the invention, and tests Nos. ⑮ and ⑯ are the tests conducted, for comparison, using a conventional antiglare film. FIG. 4 is a graph showing the relationship between the center-line mean roughness Ra (taken along the horizontal axis) and the irregularity interval Sm (taken along the vertical axis). FIG. 5 is a graph showing the relationship between the center-line mean roughness Ra (taken along the horizontal axis) and the haze value H (taken along the vertical axis). FIG. 6 is a graph showing the relationship between the irregularity interval Sm (taken along the horizontal axis) and the haze value H (taken along the vertical axis).

In FIGS. 4 to 6, solid circular and diamond-shaped marks identified by circled numerals ①, ②, ③, . . . correspond to the numbers ①, ②, ③, . . . of the tests conducted. Through examination of these graphs, the optimum characteristics of the antiglare film 2 were determined. In FIG. 4, each circled numeral is followed by two rows of symbols "○" or "X", of which the upper row indicates the evaluation made without the touch panel and the lower row indicates the evaluation made with the touch panel.

The test results show-the following. When Ra<0.3, antiglare performance is unsatisfactory; when Ra>0.4, glare is intolerable. When Sm<50 or Sm>80, antiglare performance is unsatisfactory. When H<5, antiglare performance is unsatisfactory; when H>20, the contrast of the displayed image is too low to obtain satisfactory viewability.

Accordingly, by confining the center-line mean roughness Ra (μm), irregularity interval Sm (μm), and haze value H (%) within the ranges noted below, it is possible to obtain a liquid crystal display device that offers satisfactory viewability.

$$0.3 \leq Ra \leq 0.4$$

$$50 \leq Sm \leq 80$$

$$5 \leq H \leq 20$$

According to the present invention, the antiglare film, which is placed behind the touch panel as seen from the viewer, has its characteristics optimized so as to offer effective antiglare performance. Thus, it is possible to realize a liquid crystal display device having a touch panel that offers satisfactory image quality with a minimum of unwanted reflection and glare. Moreover, since the touch panel is placed at the forward end, touch operations can be performed without difficulty. This makes the liquid crystal display device useful even when incorporated in a portable digital assistant and used outdoors.

Moreover, by securing a gap between the antiglare film and the touch panel, it is possible to suppress interference between the light reflected from the antiglare film and the light reflected from the touch panel, and thereby further enhance the viewability of the liquid crystal display device.

TABLE 1

Determination of the Optimum Range of the Irregularity Interval Sm

| | Ra (μm) | Sm (μm) | H (%) | Touch Panel Included? | Glare | Antiglare Performance | Image Reproducibility |
|---|---|---|---|---|---|---|---|
| ① | 0.35 | 45 | 13 | No | X | ○ | ○ |
| | | | | Yes | ○ | X | ○ |
| ② | 0.34 | 50 | 15 | No | X | X | ○ |
| | | | | Yes | ○ | ○ | ○ |
| ③ | 0.36 | 65 | 18 | No | X | X | ○ |
| | | | | Yes | ○ | ○ | ○ |
| ④ | 0.37 | 80 | 14 | No | X | X | ○ |
| | | | | Yes | ○ | ○ | ○ |
| ⑤ | 0.30 | 85 | 13 | No | X | X | ○ |
| | | | | Yes | ○ | X | ○ |

TABLE 2

Determination of the Optimum Range of the Center-Line Mean Roughness Ra

| | Ra (μm) | Sm (μm) | H (%) | Touch Panel Included? | Glare | Antiglare Performance | Image Reproducibility |
|---|---|---|---|---|---|---|---|
| ⑥ | 0.25 | 60 | 14 | No | ○ | ○ | ○ |
| | | | | Yes | ○ | X | ○ |
| ⑦ | 0.28 | 62 | 16 | No | ○ | ○ | ○ |
| | | | | Yes | ○ | X | ○ |
| ⑧ | 0.30 | 65 | 13 | No | X | X | ○ |
| | | | | Yes | ○ | ○ | ○ |
| ⑨ | 0.40 | 70 | 14 | No | X | X | ○ |
| | | | | Yes | ○ | ○ | ○ |
| ⑩ | 0.45 | 61 | 17 | No | X | X | X |
| | | | | Yes | X | ○ | ○ |

TABLE 3

Determination of the Optimum Range of the Haze Value H

| | Ra (μm) | Sm (μm) | H (%) | Touch Panel Included? | Glare | Antiglare Performance | Image Reproducibility |
|---|---|---|---|---|---|---|---|
| ⑪ | 0.32 | 60 | 3 | No | X | X | ○ |
| | | | | Yes | ○ | X | ○ |
| ⑫ | 0.36 | 60 | 5 | No | X | X | ○ |
| | | | | Yes | ○ | ○ | ○ |
| ⑬ | 0.30 | 65 | 20 | No | ○ | X | X |
| | | | | Yes | ○ | ○ | ○ |
| ⑭ | 0.34 | 64 | 22 | No | X | X | X |
| | | | | Yes | ○ | ○ | X |

TABLE 4

Examples for Comparison

| | Ra (μm) | Sm (μm) | H (%) | Touch Panel Included? | Glare | Antiglare Performance | Image Reproducibility |
|---|---|---|---|---|---|---|---|
| ⑮ | 0.35 | 40 | 0 | No | X | ○ | ○ |
| | | | | Yes | ○ | X | ○ |
| ⑯ | 0.16 | 47 | 11 | No | ○ | ○ | ○ |
| | | | | Yes | X | X | ○ |

What is claimed is:

1. A liquid crystal display device having a touch panel that exploits a shutter effect of a liquid crystal layer, wherein an antiglare film is placed behind the touch panel as seen from a viewer and the antiglare film fulfills conditions (1), (2), and (3) below:

$$0.3 < Ra \leq 0.4 \quad (1)$$

$$50 < Sm \leq 80 \quad (2)$$

$$5 \leq H \leq 20 \quad (3)$$

where Ra represents a center-line mean roughness ($\mu$m) of a surface of the antiglare film, Sm represents an irregularity interval ($\mu$m) of the surface, and H represents a haze value (%).

2. A liquid crystal display device as claimed in claim 1, wherein the touch panel, the antiglare film, a first polarizer plate, a first phase-difference plate, an STN-type liquid crystal display element, a second phase-difference plate, and a second polarizer plate are arranged in this order from a viewer side.

3. A liquid crystal display device as claimed in claim 2, wherein the touch panel is of a type that employs a resistive film.

4. A liquid crystal display device as claimed in claim 3, wherein a gap is secured between the touch panel and the antiglare film.

* * * * *